United States Patent
Park et al.

(10) Patent No.: US 7,209,464 B2
(45) Date of Patent: Apr. 24, 2007

(54) VERIFICATION SYSTEM AND METHOD FOR PACKET CALL PROCESSING OPERATION OF MOBILE TELEPHONE

(75) Inventors: Ae-Soon Park, Daejeon (KR); Nak-Woon Sung, Daejeon (KR)

(73) Assignees: Electronics and Telecommunications Research Institute, Daejeon (KR); Curitel Communications, Inc., Incho-shi, Kyoungki-do (KR)

(*) Notice: Subject to any disclaimer, the term of this patent is extended or adjusted under 35 U.S.C. 154(b) by 949 days.

(21) Appl. No.: 10/022,729

(22) Filed: Dec. 20, 2001

(65) Prior Publication Data

US 2003/0053428 A1 Mar. 20, 2003

(30) Foreign Application Priority Data

Sep. 19, 2001 (KR) ............................... 2001-57906

(51) Int. Cl.
*H04Q 7/24* (2006.01)
(52) U.S. Cl. ...................... 370/338; 370/348; 370/329; 370/395.52
(58) Field of Classification Search ................ 370/348, 370/395.52, 395.53, 395.54, 338; 709/230, 709/236
See application file for complete search history.

(56) References Cited

U.S. PATENT DOCUMENTS

| | | | | |
|---|---|---|---|---|
| 5,394,540 | A * | 2/1995 | Barrington et al. ............ | 703/21 |
| 6,119,167 | A * | 9/2000 | Boyle et al. ................. | 709/234 |
| 6,185,420 | B1 * | 2/2001 | Choi ............................ | 455/423 |
| 6,230,012 | B1 * | 5/2001 | Willkie et al. ............ | 455/435.1 |
| 6,243,832 | B1 | 6/2001 | Eckes et al. | |
| 6,370,394 | B1 * | 4/2002 | Anttila ........................ | 455/417 |
| 6,404,754 | B1 * | 6/2002 | Lim ............................. | 370/338 |
| 6,483,822 | B1 * | 11/2002 | Lioy et al. ................... | 370/329 |
| 6,549,543 | B1 * | 4/2003 | Shin ............................ | 370/474 |
| 6,625,472 | B1 * | 9/2003 | Farazmandnia et al. ..... | 455/557 |
| 6,654,360 | B1 * | 11/2003 | Abrol ......................... | 370/329 |
| 6,721,555 | B1 * | 4/2004 | Phillips et al. .............. | 455/411 |
| 6,832,184 | B1 * | 12/2004 | Bleier et al. .................. | 703/23 |
| 6,898,640 | B1 * | 5/2005 | Kurita et al. ................ | 709/238 |
| 7,006,963 | B1 * | 2/2006 | Maurer ........................ | 703/21 |
| 2002/0049059 | A1 * | 4/2002 | Soininen et al. ............ | 455/439 |
| 2003/0031302 | A1 * | 2/2003 | Resuta ..................... | 379/27.02 |
| 2004/0029638 | A1 * | 2/2004 | Hytcheson et al. ........... | 463/42 |

FOREIGN PATENT DOCUMENTS

WO    WO 97/37479    10/1997

* cited by examiner

*Primary Examiner*—Wing Chan
*Assistant Examiner*—Andrew C. Lee
(74) *Attorney, Agent, or Firm*—Lowe Hauptman & Berner, LLP (57) ABSTRACT

A verification system and method for packet call processing of a mobile telephone. Each IP address is assigned to a terminal, a packet service simulator and the mobile telephone. The packet service simulator simulates a control signal of UTRAN necessary for the mobile telephone and connects data traffic to an internet after a packet call establishment. The packet service simulator transmits an IP packet generated from the terminal to its Ethernet address, receives a packet for the terminal and transmits it to the mobile telephone. For this, the packet service simulator responds to the terminal's ARP request. The terminal is linked to the mobile telephone via a PPP, and the mobile telephone and the packet service simulator to an external internet via an Ethernet.

21 Claims, 5 Drawing Sheets

VERIFICATION SYSTEM AND METHOD FOR PACKET CALL PROCESSING OPERATION OF MOBILE TELEPHONE

BACKGROUND OF THE INVENTION (a) Field of the Invention

The present invention relates to a verification system and method for a packet call processing operation of a mobile telephone. More specifically, the present invention relates to a verification system and method for verifying the radio packet data service operation of a mobile telephone.

(b) Description of the Related Art

Figure 1:
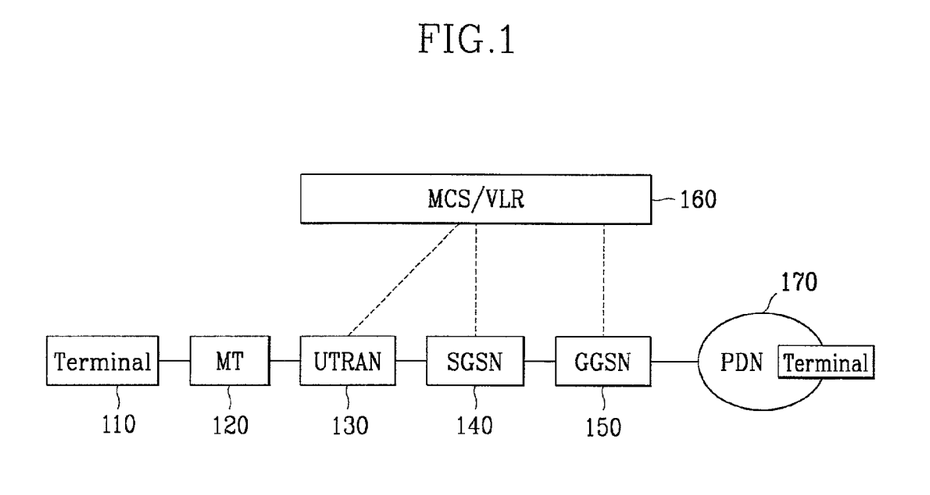
FIG. 1 is a schematic diagram of an IMT-2000 network for a general packet data service.

FIG. 1 is a schematic of an IMT-2000 network for providing a packet data service.

A mobile subscriber uses a terminal 110, e.g., a notebook computer or a general personal computer to have access to a mobile telephone 120 and get a packet data service such as the internet.

The mobile telephone 120 is linked to a UMTS (Universal Mobile Telecommunications System) terrestrial radio access network (abbreviated to UTRAN) 130 via an air interface, the UMTS terrestrial radio access network 130 being linked to a serving GPRS (General Packet Radio Service) support node (abbreviated to SGSN) 140 via an asynchronous transfer mode (ATM) or an internet protocol (IP) network, the SGSN 140 being linked to an external public domain network (PDN) 170 via a gateway GPRS support node (abbreviated to GGSN) 150.

To develop the packet data service of a mobile telephone in the above-configured packet data service system, there is a need for embodying the UMTS terrestrial radio access network 130, the SGSN 140, the GGSN 150, and a mobile switching center 160.

In the development of the packet data service of a mobile telephone according to prior art, however, the mobile telephone cannot be developed independent of other equipment (e.g., radio access network, SGSN, GGSN, mobile switching center, etc.).

Furthermore, a conventional simulator for data verification such as PING (Packet InterNet Gopher), which has been used to verify the packet call processing operation of the mobile telephone, is incapable of verifying the operation of the mobile telephone for processing various data including Web, Telnet, or file transfer protocol (FTP) on the internet.

SUMMARY OF THE INVENTION

It is an object of the present invention to solve the problems with the prior art and to develop and verify a packet data service of a mobile telephone in the situation in which all systems including UTRAN or the like are not constructed.

It is another object of the present invention to verify a control path between a mobile telephone and a terminal in generation of a packet call, to transmit internet protocol traffic generated from the terminal to an actual internet after generation of the packet call, to receive a corresponding response packet, and to transmit it to the mobile telephone and the terminal, thereby verifying a data path between the mobile telephone and the terminal, when developing a packet data service for the terminal and the mobile telephone.

In one aspect of the present invention, there is provided a verification system for the packet call processing operation of a mobile telephone that includes: a terminal for transmitting a packet call request message to the mobile telephone to establish a packet call for communication of packets with the mobile telephone, generating an internet protocol packet after establishment of the packet call, transmitting it to the mobile telephone, and determining data processing characteristics of the mobile telephone based on a response packet received from the mobile telephone; and a packet service simulator for receiving a response control message to the packet call request message from the mobile telephone to verify the control message processing between the terminal and the mobile telephone, and transmitting the internet protocol packet received from the mobile telephone to an external internet and transmitting a corresponding response packet received from the external internet to the mobile telephone, thereby enabling the mobile telephone to transmit the response packet to the terminal.

An internet protocol address is individually assigned to the terminal, the mobile telephone, and the packet service simulator. The mobile telephone is linked to the packet service simulator via a local area network (LAN), the packet service simulator being linked to the external internet. Preferably, the network is connected to the external internet via a hub and gateway.

The terminal is linked to the mobile telephone via a universal serial bus (USB) and communicates packets with the mobile telephone according to a point-to-point (PPP) protocol. A physical layer of the mobile telephone includes an Ethernet and a media control layer of the mobile telephone is a module for supporting the Ethernet.

The packet service simulator analyzes the response control message received from the mobile telephone, generates a response packet when the response control message is successfully processed, and transmits it to the mobile telephone to establish the packet call.

The packet service simulator also includes: a packet transmitter for transmitting data having an internet protocol address of the terminal to the external internet; and a packet receiver for receiving a packet destined for the internet protocol address of the terminal from the external internet and transmitting it to the mobile telephone, thereby enabling the mobile telephone to transfer the packet to the terminal.

In particular, the packet service simulator receives the packet destined for the internet protocol access of the terminal in response to an address resolution protocol (ARP) request for the internet protocol address of the terminal, sent from the external access network, using its physical address.

The terminal executes an internet application including Telnet, file transfer protocol (FTP), or the Web to generate an internet protocol packet and transmit it to the mobile telephone, and receives a response packet to the internet protocol packet from the mobile telephone to verify internet data processing operations of the mobile telephone.

In another aspect of the present invention, there is provided a verification method for the packet call processing operation of a mobile telephone, in which the mobile telephone is connected to a terminal and a packet service simulator that is linked to an external internet. The verification method includes: upon the mobile telephone receiving a packet call request for verification of a packet data service from the terminal and transmitting a corresponding call request control message, the packet service simulator analyzing the call request control message received from the mobile telephone and verifying the control signal processing between the mobile telephone and the terminal; upon successful control signal processing, the packet service simulator generating a packet corresponding to a response signal to the packet call request control message and transmitting it to the mobile telephone, thereby establishing a packet call to the mobile telephone; the terminal executing an internet application, generating an internet protocol packet and transmitting it to the mobile telephone; upon receiving the internet protocol packet having an internet protocol address of the terminal from the mobile telephone, the packet service simulator transmitting the internet protocol packet to the external internet; the packet service simulator receiving a response packet destined for the terminal from the external internet and transmitting it to the mobile telephone; and upon receiving the response packet from the mobile telephone, the terminal verifying an operation of the internet application based on the response packet and preparing statistic data for the received packet.

The verification method may further include: assigning an internet protocol address individually to the terminal, the packet service simulator, and the mobile telephone; and the packet service simulator broadcasting an address resolution protocol (ARP) packet, including an internet protocol address of the terminal and a physical address of the simulator, to the external internet and recording it on a gateway for connection to the external internet so as to receive a packet having the address of the terminal.

The step of the terminal transmitting the internet protocol packet to the mobile telephone includes establishing point-to-point protocol (PPP) access to the mobile telephone, and transmitting the internet protocol packet to the mobile telephone according to a PPP protocol.

The step of the packet service simulator receiving the response packet destined for the terminal from the external internet includes: transmitting to the external internet the ARP response packet having a physical address of the simulator, and an internet protocol address of the terminal to the ARP request packet requesting the physical address of the terminal sent from the external internet; and receiving the response packet destined for the terminal.

In addition, the verification method includes: the terminal requesting cancellation of a packet call established between the mobile telephone and the packet service simulator; the mobile telephone transmitting a corresponding call cancellation control message to the packet service simulator; and the packet service simulator canceling the packet call to the mobile telephone based on the received control message and transmitting a corresponding response message to the mobile telephone to inform that the packet call is cancelled.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 2:
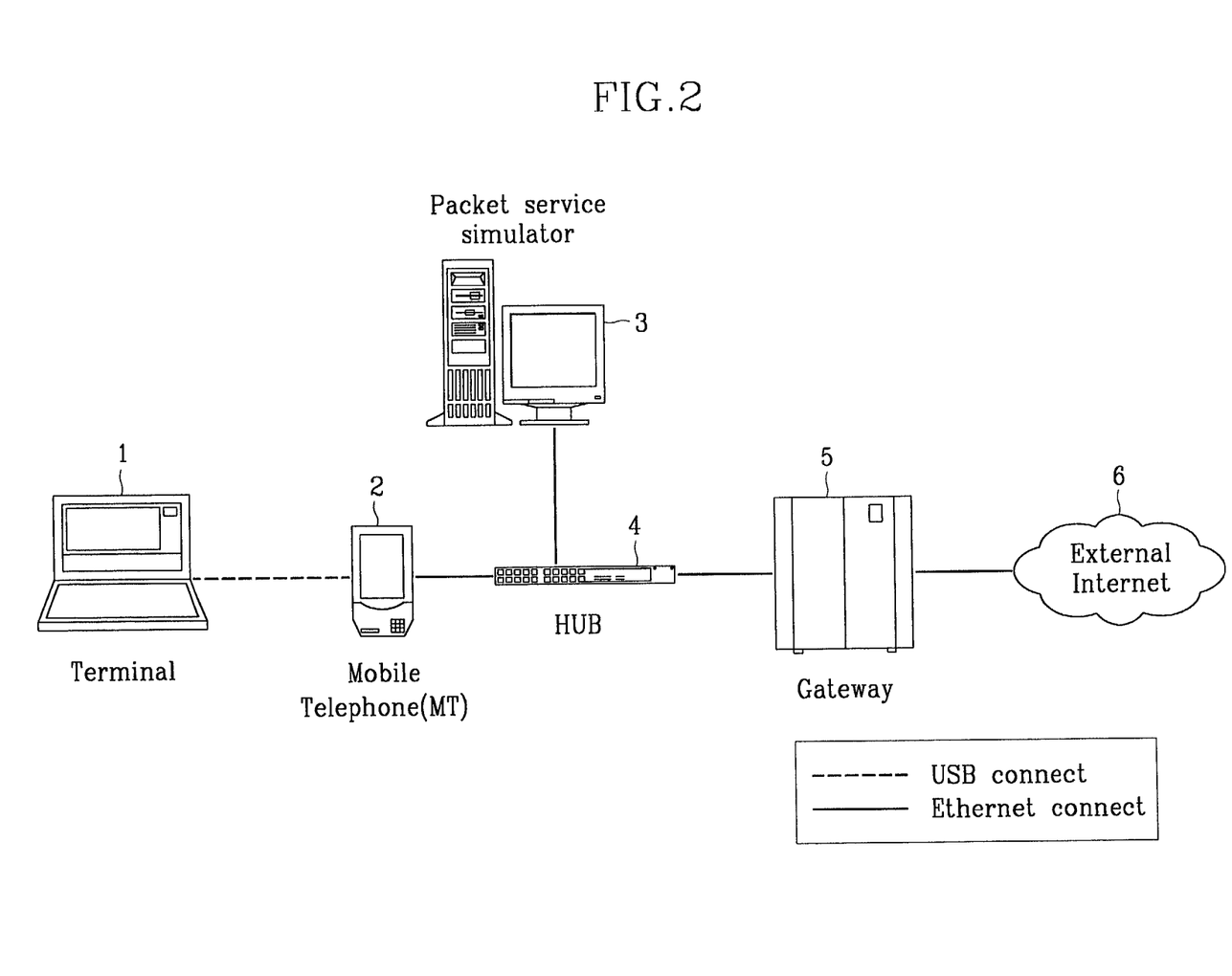
FIG. 2 is a schematic diagram of a verification system for a packet call processing operation of a mobile telephone in accordance with an embodiment of the present invention.

FIG. 2 shows the structure of a verification system for the packet call processing operation of a mobile telephone in accordance with an embodiment of the present invention.

As shown in FIG. 2, the system comprises a terminal 1 and a packet service simulator 3 to develop a packet data service and verify it in a mobile telephone 2.

The mobile telephone 2 is linked to the packet service simulator 3 via a local area network (LAN) instead of an air interface, and the packet service simulator 3 is linked to an external internet 6 via a gateway 5. For this purpose, a hub 4 is connected among the mobile telephone 2, the packet service simulator 3 and the gateway 5, to which an internet protocol address is individually assigned.

Figure 3:
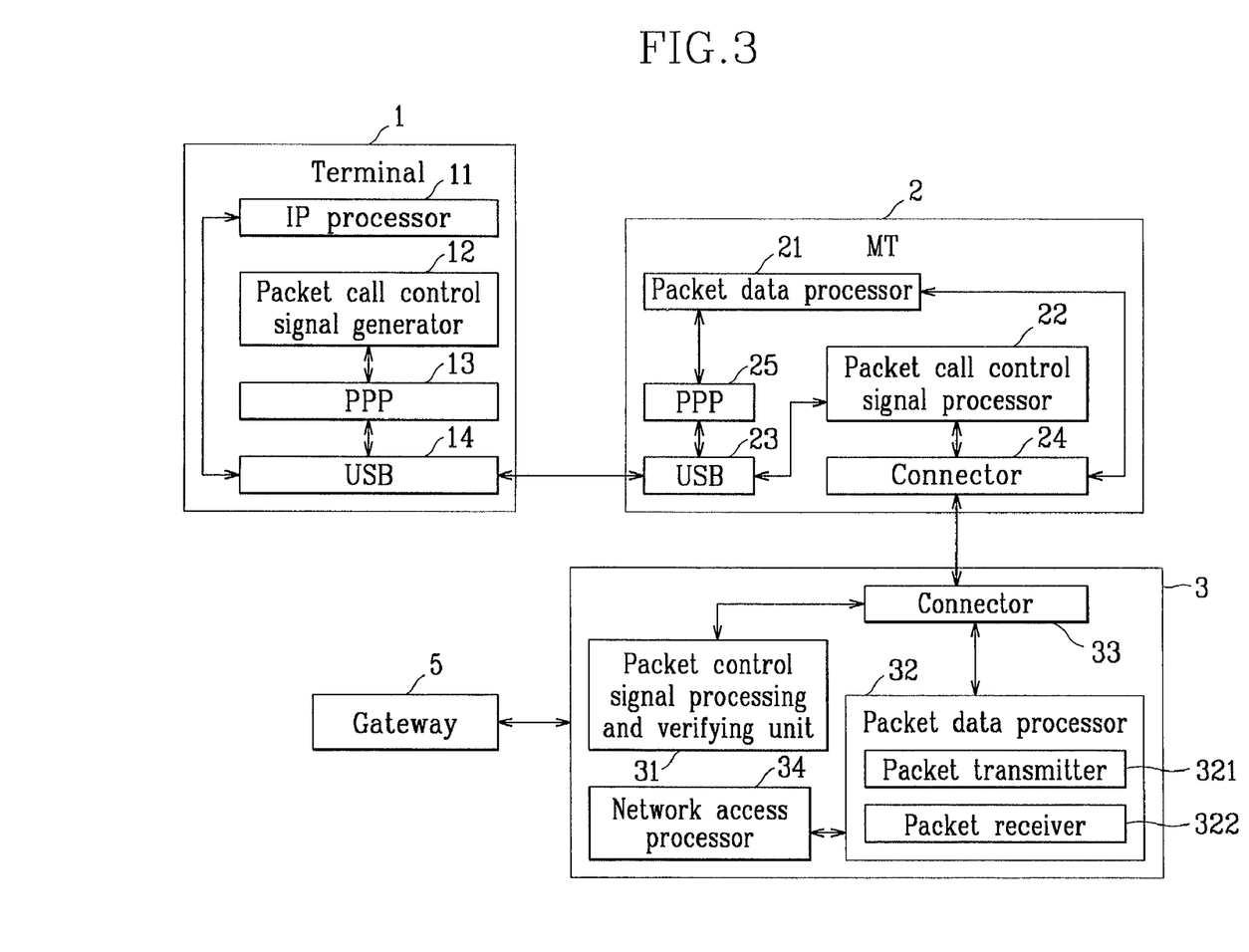
FIG. 3 is a detailed schematic diagram of the verification system shown in FIG. 2.

FIG. 3 shows the detailed structure of the verification system for the packet call processing operation of a mobile telephone in accordance with an embodiment of the present invention.

The terminal 1 is to execute internet applications (e.g., Web, Telnet, FTP, etc.) and comprises a packet call control signal generator 12 for generating a packet call control signal to initiate verification for a control path to the mobile telephone 2; an IP processor 11 for generating an internet protocol packet, transmitting it to the mobile telephone 2 and receiving a response packet to generate verification data for a data path to the mobile telephone 2; and a point-to-point protocol (PPP) communicator 13 as a PPP access protocol processor for communication with the mobile telephone 2 according to a PPP access protocol. The terminal 1 is linked to the mobile telephone 2 via a universal serial bus (USB) 14.

The mobile telephone 2 comprises a packet call control signal processor 22 for processing the packet call control signal received from the terminal 1 via a USB 23 and transmitting it to the packet service simulator 3, a packet data processor 21 for processing the internet protocol packet, transmitting it to the packet service simulator 3 and transferring the response packet from the packet service simulator 3 to the terminal 1, and a PPP communicator 25 for communicating with the terminal 1 according to the PPP access protocol. The mobile telephone 2 is linked to the packet service simulator 3 via an Ethernet 24.

The packet service simulator 3 comprises a packet call control signal processing and verifying unit 31 for simulating a packet control signal received from the mobile telephone 2 via an Ethernet 33; and a packet data processor 32, which comprises a packet transmitter 321 for transmitting internet protocol data among packet data received from the mobile telephone 2 to the external internet 6 and a packet receiver 322 for receiving the response packet from the external internet 6 and transmitting it to the mobile telephone 2. The packet service simulator 3 is connected to the gateway 5 linked to the hub 4 via a network access processor 34 to communicate packets with the external internet 6. In the embodiment of the present invention, the packet service simulator 3 is configured to simulate the functions of all conventional systems including UTRAN or the like, i.e., a radio access network for access to an external network, SGSN, GGSN, and a mobile switching center.

Expediently, the functions of the terminal, the mobile telephone and the packet service simulator are itemized by the respective components in this description, which are not intended to limit the present invention.

Figure 4:
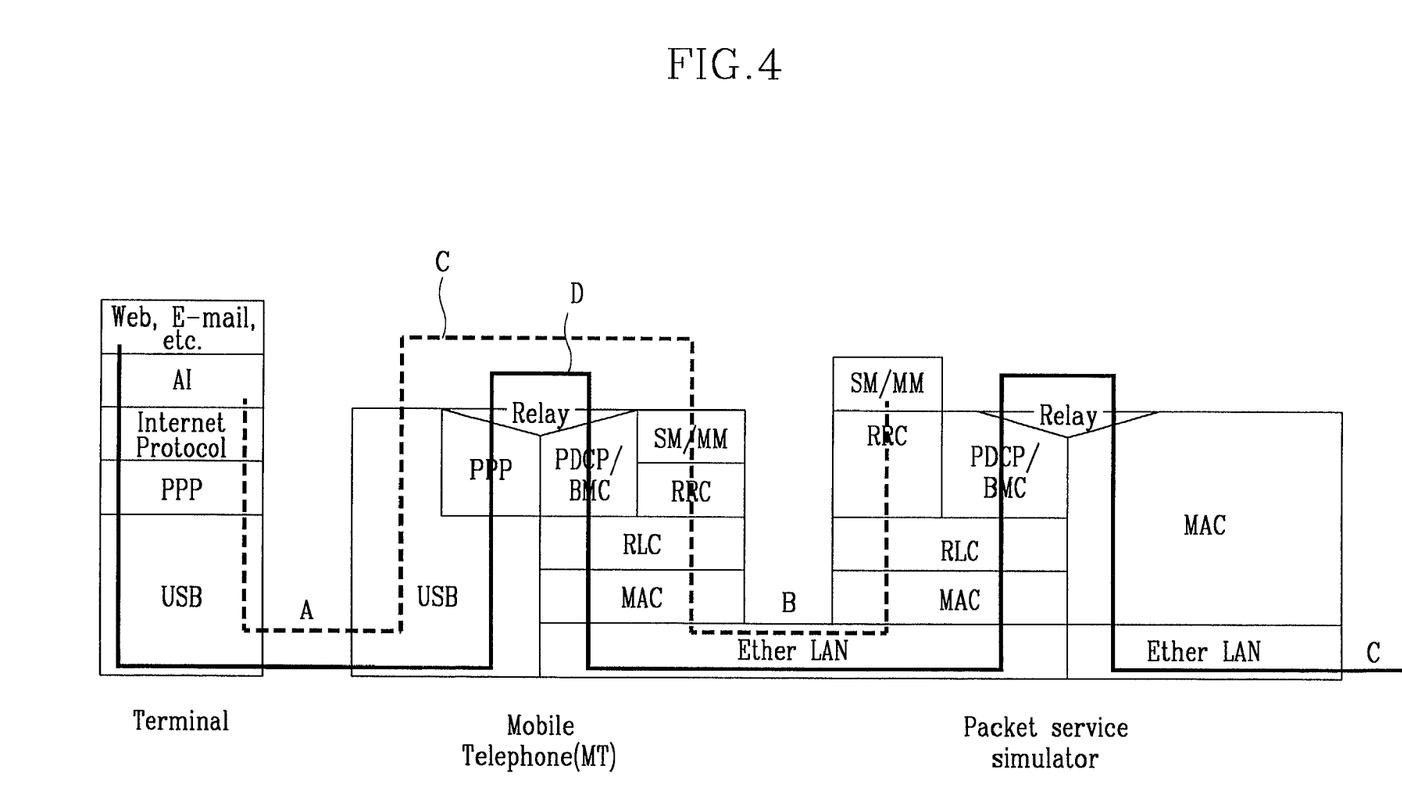
FIG. 4 shows a protocol stack of the verification system shown in FIG. 2.

FIG. 4 illustrates a protocol stack of the verification system shown in FIG. 2. The mobile telephone 2 according to an embodiment of the present invention has the same protocol stack as a packet call processing protocol stack required in an IMT-2000 mobile telephone, excepting that the physical layer is not an air interface but an Ethernet. Accordingly, the physical layer of the mobile telephone comprises an Ethernet and a media access control (MAC) layer is a module that supports the Ethernet.

The packet service simulator 3 has a protocol for processing the required functions of all systems including UTRAN or the like. For example, the control signal processing area comprises radio resource control (RRC), radio link control (RLC), and MAC layers in the UTRAN; a section message (SM)/mobility management (MM)/short message service cell broadcast (SMSCB) layer in the service GPRS support node; and the packet processing area as a user area comprises packet data convergence protocol (PDCP)/ broadcast/multicast control (BMC) and RLC layers in the UTRAN. Here, the packet is transferred via the PDCP/ BMC, RLC and MAC layers of the UTRAN and routed by use of the gateway GPRS support node.

The control signals from the terminal 1, the mobile telephone 2, and the packet service simulator 3 are, as shown in FIG. 4, processed along a control signal processing path C, and the internet data traffic is processed along a data processing path D.

Now, a description will be given to an operation of the above-configured verification system for the packet call processing operation of a mobile telephone in accordance with an embodiment of the present invention.

Figure 5:
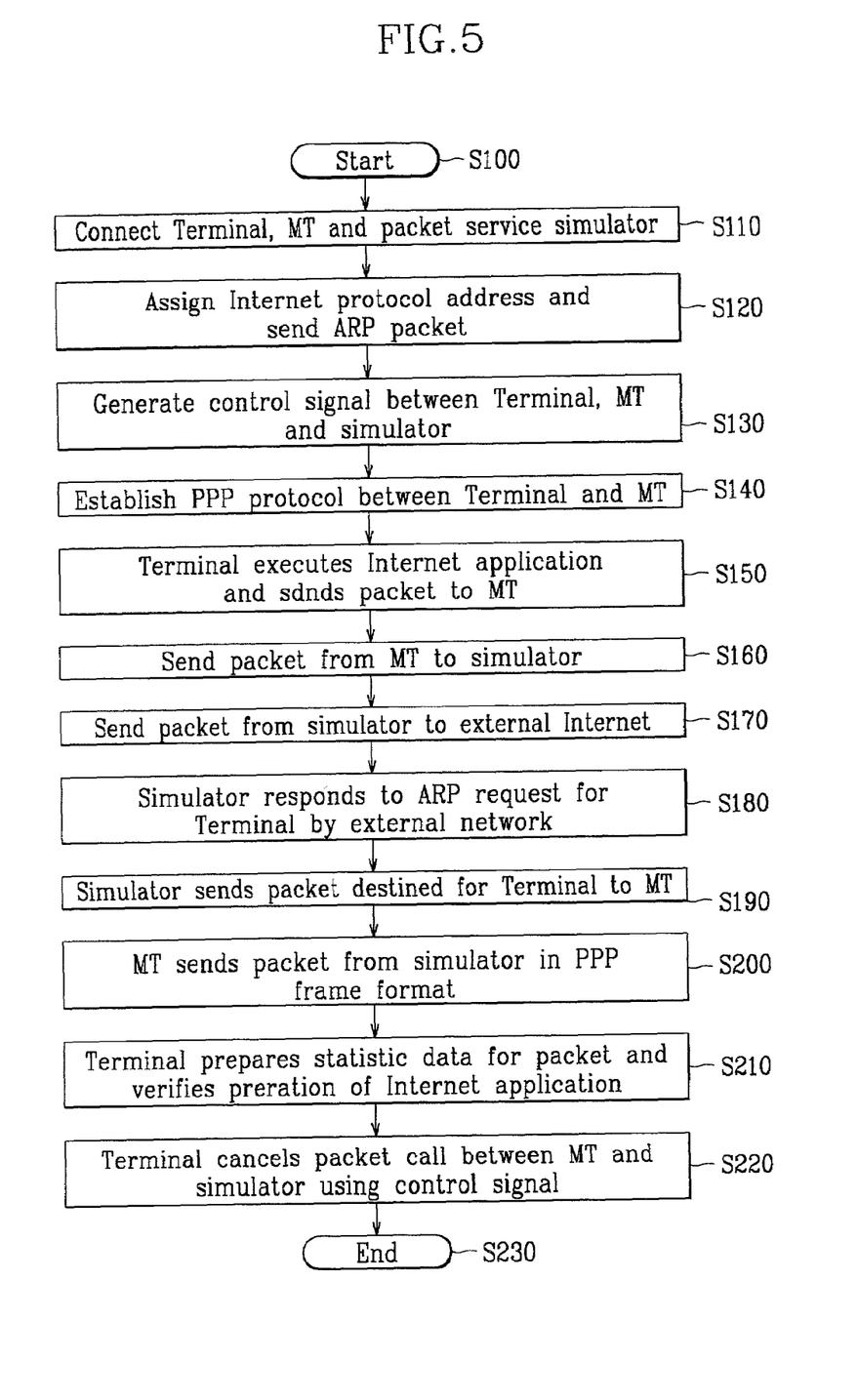
FIG. 5 is a flowchart showing a verification method for the packet call processing operation of a mobile telephone in accordance with an embodiment of the present invention.

FIG. 5 shows a packet call processing method to develop and verify the packet service of a mobile telephone in accordance with an embodiment of the present invention.

To develop and verify the packet service of a mobile telephone, the terminal 1, the mobile telephone 2 and the packet service simulator 3 are connected as shown in FIG. 2, and the packet service simulator 3 is linked to the external internet 6 via hub 4 and gateway 5, in steps S100 and S10.

For packet communication with the external internet 6, an internet protocol address (IP address) is respectively assigned to the terminal 1, the mobile telephone 2 and the packet service simulator 3.

In transmitting data from the external internet 6 to the terminal 1, the packet service simulator 3 broadcasts an address resolution protocol (ARP) packet having an IP address of the terminal and a physical address (e.g., Ethernet address) of the simulator, and records it on an ARP cache of the individual device including the gateway to inform that the data are destined for the packet service simulator 3 rather than the terminal, in step S120.

To establish a packet call between the mobile telephone 2 and the packet service simulator 3, the packet call control signal generator 12 of the terminal 1 generates a packet call generation request (comprising an AT command) and transmits it to the mobile telephone 2. The packet call generation request is transferred along the control signal processing path shown in FIG. 4. In response to the packet call generation request, the packet control signal processor 22 of the mobile telephone 2 generates a corresponding control message (from the SM or MM layer), transmits it to the connector 24 that is, the RRC, the RLC and the MAC layer, and transfers a message received from the MAC layer to the packet service simulator 3 in an Ethernet frame format.

The packet control signal processing and verifying unit 31 of the packet service simulator 3 analyzes the received message, displays the result data (i.e., debug data) through a monitor (not shown) (i.e., outputs the particulars of the individual signals, including the type of signal and its response signal) and transmits a response message to the mobile telephone 2. Hence, a control signal path C between the mobile telephone 2 and the terminal 1 is verified, in step S130.

When all signals are processed successfully, the packet service simulator 3 generates a response message (i.e., a message for establishing a packet call in all systems including UTRAN or the like) to inform that packet call generation is granted, and the terminal 1 establishes a PPP access to transmit an internet protocol packet to the mobile telephone 2, in step S140.

With the PPP access established between the terminal 1 and the mobile telephone 2, the terminal 1 executes internet applications to transmit an internet packet to the mobile telephone 2. That is, the IP processor 11 of the terminal 1 transmits an internet packet according to execution of internet applications (e.g., web, mail, file transmission, PING, etc.) to the mobile telephone 2 via the PPP communicator 13, in step S150. In the embodiment of the present invention, the terminal executes all internet applications available to verify the data processing operation of the mobile telephone 2.

Upon receiving PPP fames from the terminal 1 via the PPP communicator 25, the packet data processor 21 of the mobile telephone 2 extracts the internet packet from the PPP frames, segments it into the minimum information units and transmits the segmented internet packet to the packet service simulator 3 in an Ethernet frame format, in step S160.

The packet data processor 32 of the packet service simulator 3 reconstructs the segmented internet packet received from the mobile telephone 2 (RLC layer), removes a protocol header of the internet packet, related to radio communication, and transmits internet protocol data having the IP address of the terminal 1 in an Ethernet frame format having the Ethernet address of the packet service simulator 3 to the gateway 5, thereby transferring the internet protocol data to the external internet 6, in step S170.

On receiving a response to the internet protocol packet of the terminal 1 from the external internet 6, the gateway 5 broadcasts an ARP request packet including the Ethernet address of the terminal and the internet protocol address of the terminal, requesting the Ethernet address of the terminal to the gateway 5 or the like so as to transmit the response to the terminal.

Accordingly, the packet service simulator 3 transmits a response packet to the ARP request packet, including the Ethernet address of the simulator and the internet protocol address of the terminal, to the gateway 5 as if the terminal 1 linked to the mobile telephone 2 via the USB is connected to the Ethernet network including the gateway 5 or the like.

That is, the packet service simulator 3 transmits the packet service simulator's Ethernet address instead of an address of the terminal 1 to an Ethernet address of a device that can receive the internet protocol response packet received from the external internet 6.

The gateway 5 then transfers the response packet, sent from the external internet 6 and destined for the terminal, to the packet service simulator 3.

Without a response to the ARP request packet from the packet service simulator 3, all the response packets destined for the terminal are neglected, and the packet service simulator 3 transmits the ARP response packet to its Ethernet address, as described above, as if the terminal 1 is connected to the Ethernet network including the gateway 5 or the like, so that all the internet protocol packets destined for the terminal 1 from the external internet 6 are sent to the packet service simulator 3, in step S180.

Upon receiving the response packet from the gateway 5, the packet data processor 32 of the packet service simulator 3 segments the received response packet and transmits it to the mobile telephone 2 in the Ethernet frame format, in step S190. The mobile telephone 2 reconstructs the segmented response packet and transmits it to the terminal 1 via the PPP communicator 25, and the terminal 1 verifies the executions of internet applications (e.g., web, mail, file transmission, PING, etc.) based on the response packet, in steps S200 and S210.

More specifically, the IP processor 11 of the terminal 1 uses the response packet received via the PPP communicator 13 to verify the data processing path to the mobile telephone 2, determines a statistic value for the communicated data and displays the result through a monitor or the like.

It is accordingly possible to simulate whether the mobile telephone normally transmits the data packets to the external internet and receives response data packets from the external internet, and determine the quantity and quality of traffic data sent to the mobile telephone via the data path even in the situation that all systems including UTRAN or the like for access to the external internet are not embodied.

When the verification for the data path of the mobile telephone 2 ends, the packet call control signal generator 12 of the terminal 1 transmits a packet call cancellation control packet to cancel the PPP protocol established between the terminal 1 and the mobile telephone 2 and the packet call between the mobile telephone 2 and the packet service simulator 3, in step S220.

Upon receiving a call cancellation request from the terminal 1 to cancel a packet call between the mobile telephone 2 and the packet service simulator 3, the mobile telephone 2 transmits a call cancellation control message to the packet service simulator 3. The packet service simulator 3 analyzes the received control message to cancel the packet call and transmits a response message provided by UTRAN or the like to the mobile telephone 2 to inform that the call is cancelled.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, the present invention verifies operations related to a packet call between a terminal and a mobile telephone in a situation in which equipment including UTRAN or the like other than the terminal and the mobile telephone is not embodied.

In regard to verification of the operations related to the packet call, the present invention executes all internet applications available in the terminal as well as a simple internet application such as PING in verifying a data path to transmit a corresponding packet to an actual internet and transmit a corresponding response to the terminal, thereby simulating the packet-related operations of the terminal and the mobile telephone in the same situation as the real one, and guaranteeing more accurate verification for the operations.

Furthermore, the present invention can route the IP packet to the external internet without changing the packet in the mobile telephone or the terminal.

What is claimed is:

1. A verification system for a packet call processing operation of a mobile telephone, the verification system comprising:

a terminal for transmitting a packet call control signal to the mobile telephone to establish a packet call for communication of packets with the mobile telephone, generating an internet protocol packet after establishment of the packet call, transmitting the internet protocol packet to the mobile telephone, and determining data processing characteristics of the mobile telephone based on a response packet received from the mobile telephone; and a packet service simulator for receiving the packet call control signal from the mobile telephone to verify the packet call processing operation between the terminal and the mobile telephone, and transmitting the internet protocol packet received from the mobile telephone to an external network and transmitting a corresponding response packet received from the external network to the mobile telephone, thereby enabling the mobile telephone to transmit the corresponding response packet to the terminal, wherein the terminal executes a network application including Telnet, file transfer protocol (FTP), or the Web to generate an internet protocol packet and transmit the internet protocol packet to the mobile telephone, and receives a response packet to the internet protocol packet from the mobile telephone to verify network data processing operations of the mobile telephone.

2. The verification system as claimed in claim 1, wherein an internet protocol address is individually assigned to the terminal, the mobile telephone, and the packet service simulator.

3. The verification system as claimed in claim 1, wherein the mobile telephone is linked to terminal via a local area network (LAN), the packet service simulator being linked to the external network.

4. The verification system as claimed in claim 1, wherein the packet service simulator analyzes the packet call control signal received from the mobile telephone, generates the corresponding response packet when the response control message is successfully processed, and transmits it to the mobile telephone to establish the packet call.

5. The verification system as claimed in claim 2, wherein the packet service simulator comprises:

a packet transmitter for transmitting data having an internet protocol address of the terminal to the external network in an Ethernet packet format; and a packet receiver for receiving the corresponding response packet destined for the internet protocol address of the terminal from the external network and transmitting the corresponding response packet to the mobile telephone, thereby enabling the mobile telephone to transfer the corresponding response packet to the terminal.

6. The verification system as claimed in claim 2, wherein the packet service simulator receives the corresponding response packet destined for the internet protocol access of the terminal in response to an address resolution protocol (ARP) request for the internet protocol address of the terminal, sent from the external access network, using its physical address.

7. The verification system as claimed in claim 1 wherein the terminal is linked to the mobile telephone via a universal serial bus (USB).

8. The verification system as claimed in claim 1, wherein the terminal communicates packets with the mobile telephone according to a point-to-point protocol (PPP).

9. The verification system as claimed in claim 1, wherein a physical layer of the mobile telephone comprises an Ethernet, and a media control layer of the mobile telephone is modified into a module for supporting the Ethernet.

10. A verification method for a packet call processing operation of a mobile telephone, in which the mobile telephone is connected to a terminal and a packet service simulator that is linked to an external network, the verification method comprising:

upon the mobile telephone receiving a packet call control signal for verification of a packet data service from the terminal and transmitting packet call control signal, the packet service simulator analyzing the packet call control signal received from the mobile telephone and verifying the packet call processing operation between the mobile telephone and the terminal;

the terminal executing a network application, generating an internet protocol packet and transmitting the internet protocol packet to the mobile telephone;

upon receiving the internet protocol packet having an internet protocol address of the terminal from the mobile telephone, the packet service simulator transmitting the internet protocol packet to an external network;

the packet service simulator receiving a response packet destined for the terminal from the external network and transmitting the response to the mobile telephone;

upon receiving the response packet from the mobile telephone, the terminal verifying an operation of the network application based on the response packet and preparing statistic data for the received packet;

the terminal requesting cancellation of a packet call established between the mobile telephone and the packet service simulator;

the mobile telephone transmitting a call cancellation control message corresponding to the cancellation request to the packet service simulator; and the packet service simulator canceling the packet call to the mobile telephone based on the received control message and transmitting a corresponding response message to the mobile telephone to inform that the packet call is cancelled.

11. The verification method as claimed in claim 10, further comprising:

assigning an internet protocol address individually to the terminal, the packet service simulator and the mobile telephone; and the packet service simulator broadcasting an address resolution protocol (ARP) packet, including an internet protocol address of the terminal and a physical address of the simulator, to the external network and recording it on a gateway for connection to the external network so as to receive a packet having the address of the terminal.

12. The verification method as claimed in claim 10, wherein the step of the terminal transmitting the internet protocol packet to the mobile telephone comprises:

establishing point-to-point protocol (PPP) access to the mobile telephone; and transmitting the internet protocol packet to the mobile telephone according to a PPP protocol.

13. The verification system as claimed in claim 10, wherein the step of the packet service simulator receiving the response packet destined for the terminal from the external network comprises:

transmitting to the external network the ARP response packet having a physical address of the simulator and an internet protocol address of the terminal to the ARP request packet requesting the physical address of the terminal sent from the external network; and receiving the response packet destined for the terminal.

14. The verification method as claimed in claim 10, wherein the mobile telephone is linked to the packet service simulator via a local area network (LAN) and to the terminal via a universal serial bus (USB).

15. A mobile phone having a packet call processing operation, the mobile phone comprising:

a packet data processor for processing an internet protocol packet, transmitting the internet protocol packet to the packet service simulator and transferring a corresponding response packet from the packet service simulator to the terminal;

a packet call control signal processor for processing a packet call control signal received from the terminal and transmitting the packet call control signal to the packet service simulator; and a point-to-point protocol (PPP) communication for communicating with the terminal according to the PPP access protocol, wherein the terminal executes a network application including Telnet, file transfer protocol (FTP), or the Web to generate an internet protocol packet and transmit the internet protocol packet to the mobile telephone, and receives a response packet to the internet protocol packet from the mobile telephone to verify network data processing operations of the mobile telephone.

16. The mobile phone as claimed in claim 15, wherein an internet protocol address is individually assigned to the terminal, the mobile telephone, and the packet service simulator.

17. The mobile phone as claimed in claim 15, wherein the mobile telephone, which is linked to the packet service simulator via a local area network (LAN), is linked to terminal via a universal serial bus (USB).

18. The mobile phone as claimed in claim 15, wherein the packet service simulator analyzes the packet call control signal received from the mobile telephone, generates the corresponding response packet when the packet call control signal is successfully processed, and transmits it to the mobile telephone to establish the packet call.

19. The mobile phone as claimed in claim 16, wherein the packet service simulator comprises:

a packet transmitter for transmitting data having an internet protocol address of the terminal to the external network in an Ethernet packet format; and a packet receiver for receiving the corresponding response packet destined for the internet protocol address of the terminal from the external network and transmitting the corresponding response packet to the mobile telephone, thereby enabling the mobile telephone to transfer the corresponding response packet to the terminal.

20. The mobile phone as claimed in claim 16, wherein the packet service simulator receives the corresponding response packet destined for the internet protocol access of the terminal in response to an address resolution protocol (ARP) request for the internet protocol address of the terminal, sent from the external access network, using its physical address.

21. The mobile phone as claimed in claim 15, wherein the terminal communicates packets with the mobile telephone according to the PPP communication.

* * * * *